(12) United States Patent
Dirksen et al.

(10) Patent No.: US 10,302,785 B2
(45) Date of Patent: May 28, 2019

(54) GEOSTEERING USING ROCK GEOMECHANICAL PROPERTIES DERIVED FROM DRILLING DATA AND AN ACCURATE DRILLING MODEL

(71) Applicant: FracGeo LLC, The Woodlands, TX (US)

(72) Inventors: Ronald Dirksen, Spring, CO (US); Ahmed Ouenes, Centennial, CO (US)

(73) Assignee: FracGeo, LLC, The Woodlands, TX (US)

( * ) Notice: Subject to any disclaimer, the term of this patent is extended or adjusted under 35 U.S.C. 154(b) by 0 days.

(21) Appl. No.: 15/648,747

(22) Filed: Jul. 13, 2017

(65) Prior Publication Data
US 2018/0017691 A1    Jan. 18, 2018

Related U.S. Application Data

(60) Provisional application No. 62/361,601, filed on Jul. 13, 2016.

(51) Int. Cl.
*G01V 1/28* (2006.01)
*G01V 1/30* (2006.01)
(Continued)

(52) U.S. Cl.
CPC ............... *G01V 1/282* (2013.01); *E21B 7/04* (2013.01); *E21B 47/024* (2013.01); *E21B 47/02208* (2013.01); *G01V 1/306* (2013.01); *G01V 1/50* (2013.01); *G01V 11/00* (2013.01); *G01V 1/301* (2013.01); *G01V 2210/616* (2013.01); *G01V 2210/62* (2013.01); *G01V 2210/6242* (2013.01); *G01V 2210/6248* (2013.01);
(Continued)

(58) Field of Classification Search
CPC .... E21B 47/024; E21B 7/04; E21B 47/02208; G01V 11/00; G01V 1/282; G01V 1/306; G01V 1/50; G01V 2210/62; G01V 1/301; G01V 2210/6242; G01V 2210/66; G01V 2210/6248; G01V 2210/616; G01V 2210/64; G06F 17/10
USPC .......................................................... 367/73
See application file for complete search history.

(56) References Cited

U.S. PATENT DOCUMENTS 6,480,118 B1 * 11/2002 Rao .................. E21B 47/00
181/102

OTHER PUBLICATIONS

Majidi, R., Albertin, M., & Last, N. "Method for Pore Pressure Estimation Using Mechanical Specific Energy and Drilling Efficiency". Society of Petroleum Engineers, (Mar. 1, 2016) doi:10.2118/178842-MS.

(Continued)

*Primary Examiner* — Daniel L Murphy
(74) *Attorney, Agent, or Firm* — Dorr, Carson & Birney, PC

(57) ABSTRACT

A method for estimating in real time the geomechanical properties using drilling data and an accurate drilling model. An initial structural framework and initial distribution of the geomechanical and other rock properties is adjusted in real time by estimating accurately the corrected mechanical specific energy (CMSE), which is then used to estimate the geomechanical and other rock properties. For example, the updated geomechanical model can be used to geosteer the well toward the brittle zones that will achieve the best stimulation when using hydraulic fracturing in unconventional wells.

10 Claims, 5 Drawing Sheets

(51) Int. Cl.
| | |
|---|---|
| *G01V 1/50* | (2006.01) |
| *E21B 47/022* | (2012.01) |
| *E21B 47/024* | (2006.01) |
| *E21B 7/04* | (2006.01) |
| *G01V 11/00* | (2006.01) |
| *G06F 17/10* | (2006.01) |

(52) U.S. Cl.
  CPC ...... *G01V 2210/64* (2013.01); *G01V 2210/66* (2013.01); *G06F 17/10* (2013.01)

(56) References Cited

OTHER PUBLICATIONS

Logan, W.D., "Engineered Shale Completions Based on Common Drilling Data," Society of Petroleum Engineers, SPE-174839-MS (2015).

Tahmeen et al., "Identification of Natural Fractures in Reservoirs Using Drilling Parameter Models," GeoConvention 2015: New Horizons (May 2015).

Kerkar et al., "Estimation of Rock Compressive Strength Using Downhole Weight-on-Bit and Drilling Models," International Petroleum Technology Conference, IPTC 17447 (2014).

\* cited by examiner

GEOSTEERING USING ROCK GEOMECHANICAL PROPERTIES DERIVED FROM DRILLING DATA AND AN ACCURATE DRILLING MODEL

RELATED APPLICATION

The present application is based on and claims priority to the Applicants' U.S. Provisional Patent Application 62/361,601, entitled "Geosteering Using Rock Geomechanical Properties Derived From Drilling Data And An Accurate Drilling Model," filed on Jul. 13, 2016.

BACKGROUND OF THE INVENTION

Field of the Invention

The present invention relates generally to the field of systems for drilling wells. More specifically, the present invention discloses a system for optimizing in real time drilling trajectories and the position of wellbores to increase production, and to reduce drilling and completion costs and the impact of drilling and hydraulic fracturing on the environment by saving water and sand used as proppant.

Background of the Invention

The statements in this section merely provide background information related to the present disclosure and may not constitute prior art.

The ultimate objective of drilling oil and gas wells is to optimize the production and recovery of hydrocarbons in the surrounding rock. One methodology being used in the industry is a practice called geosteering, where the model of the subsurface geological structure and/or rock properties are being updated using real-time data obtained during drilling and the information is then used to confirm, or correct the wellbore trajectory to position it in the best possible position to achieve the wellbore objectives. The data being used to update the rock properties are petrophysical parameters gathered through cuttings, or gas analysis at surface, or from Measurements While Drilling (MWD), Logging While Drilling (LWD) measurements such as resistivity, gamma-ray, porosity and acoustic travel time as well as image data to determine relative dip angles between the rock and the wellbore.

Rock mechanical properties derived from sonic data are occasionally used as well. Rock mechanical properties play an important role in the short and long term production and recovery potential of the well being drilled, particularly in formations that require some form of stimulation treatment to achieve the desired results. This includes unconventional shale oil and gas wells and other tight (low porosity and permeability) rock formations. In the vast majority of these wells no LWD data are being acquired for geosteering purposes, or for the derivation of rock mechanical properties that will play major role in the success of the stimulation process.

Accordingly, there remains a need for developing a robust workflow that allows the real time use of drilling data to optimize the well trajectory and to assist in geosteering the wellbores towards the brittle rocks for completion optimization in unconventional reservoirs to increase hydrocarbon production, reduce drilling and completion costs and reduce the impact on the environment by saving water and sand used as proppant.

Drilling data, particularly data that can be used to determine the energy being applied to the rock face, such as rate of penetration (ROP), weight on bit (WOB), bit rotary speed (Bit RPM), bit torque and hydraulic horsepower can be used to calculate rock mechanical properties that, in turn can be used to update the subsurface geological and geomechanical models and to accomplish geosteering based on these properties similar to applying petrophysical properties as described above.

SUMMARY OF THE INVENTION

This invention provides a system for using real time drilling data to estimate in real time the distribution of geomechanical properties that can be used to geosteer the wellbore towards the most brittle zones that will achieve the best hydraulic fracturing, and thereby lead to an increase in production, reduce drilling and completion costs and impact on the environment. Geologic, geophysical and engineering data is initially gathered and processed to estimate the initial structural framework and initial distribution of the reservoir geomechanical properties. Stress data is gathered and processed. Real time drilling data are used to estimate geomechanical properties such as Young's Modulus (YM), Poisson's Ratio (PR), shear modulus (G), and other rock properties such as pore pressure (PP), stresses, porosity and natural fractures. The drilling data and the estimated rock properties are used to update the structural framework and the distribution of the resulting rock properties. A new direction of the wellbore is set towards the most brittle zones with the best stress conditions that are better highlighted with the updated distribution of the geomechanical model.

A major feature of the present invention is its ability to use the real time drilling data with an accurate drilling model to estimate the necessary downhole properties to compute the Corrected Mechanical Specific Energy (CMSE), which is used to compute in real time multiple rock properties. The accurate drilling model is able to take into account all the corrections needed, thus providing the most accurate estimating of the CMSE.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
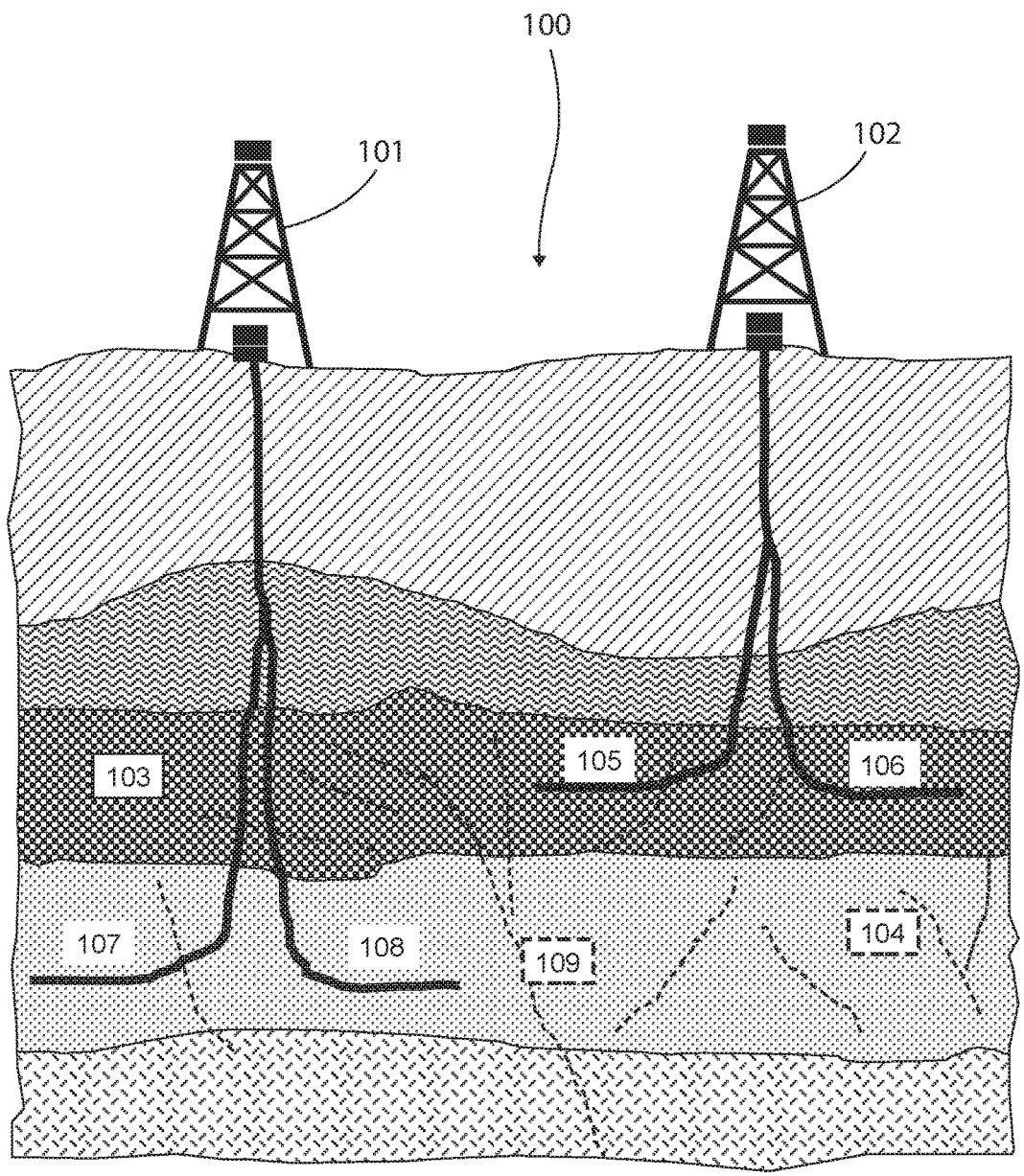
FIG. 1 is a diagrammatic representation of a cross section in a pad drilling where four horizontal wellbores are drilled in different directions and in different fractured subterranean reservoirs from one single pad.

For the purposes of promoting an understanding of the principles of the present invention, reference will now be made to the embodiments illustrated in the drawings, and specific language will be used to describe the same. It is nevertheless understood that no limitation to the scope of the disclosure is intended. Any alterations and further modifications to the described methods, devices, and systems, and any further application of the principles of the present disclosure are fully contemplated and included within the present disclosure as would normally occur to one skilled in the art to which the disclosure relates. In particular, it is fully contemplated that the steps, features or components described with respect to one embodiment may be combined with the steps, features or components described with respect to other embodiments of the present disclosure. For the sake of brevity, however, the numerous iterations of these combinations will not be described separately.

Referring initially to FIG. 1, a cross-section 100 is shown extending across two well surface locations 101 and 102. The surface location 101 has two horizontal wellbores 107 and 108 drilled in the subterranean reservoir 104 and another surface location 102 has two other horizontal wells 105 and 106 drilled in another subterranean reservoir 103. The regions 104 and 103 may include a natural fracture network 109 that extends through one or more subterranean geologic formations.

Figure 2:
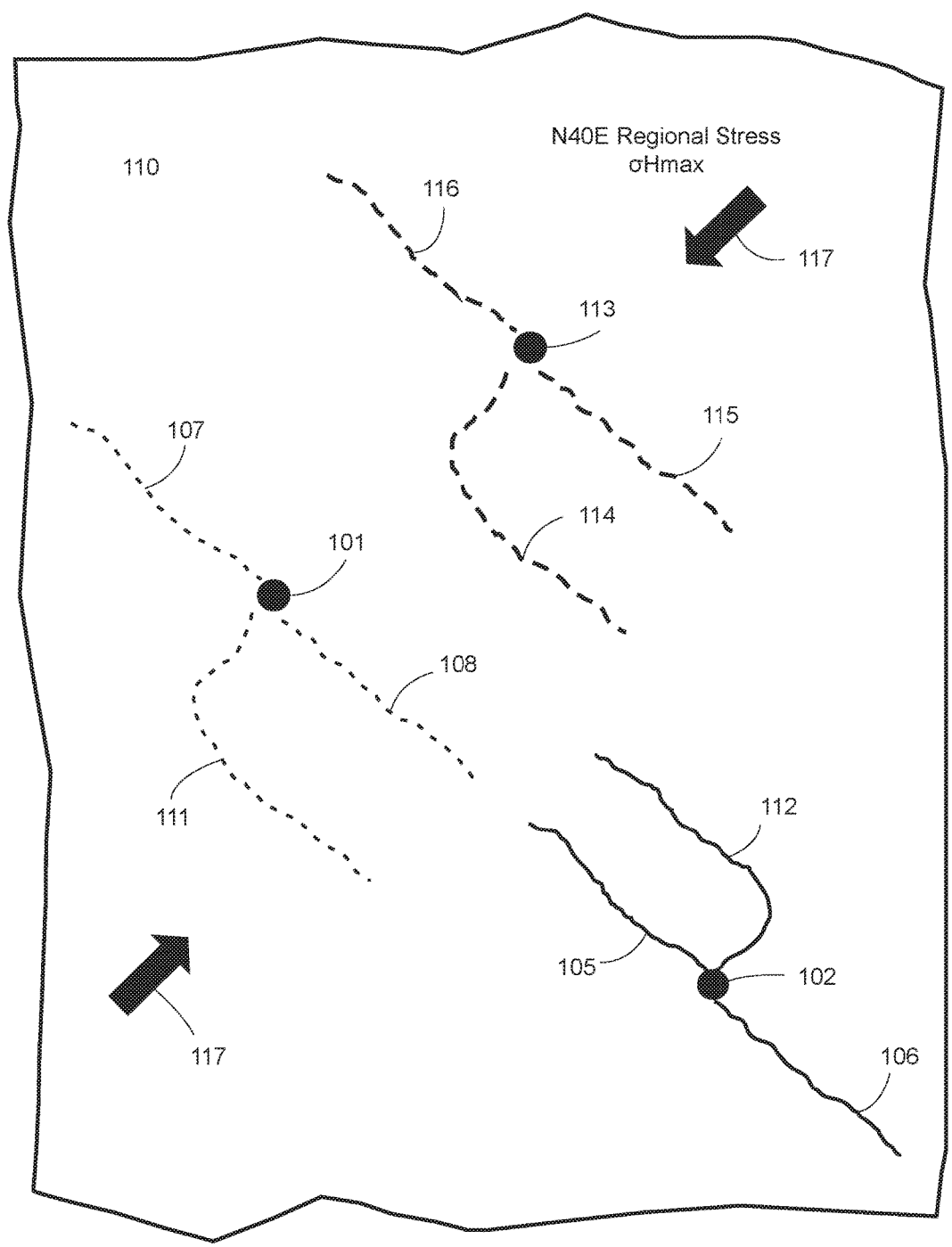
FIG. 2 is a diagrammatic representation of an aerial view of a pad drilling where multiple pads each with multiple horizontal wellbores are drilled in different directions.

Generally, the cross-section 100 is representative of any type of field 110 shown in FIG. 2 where natural resources are obtained. In some particular instances, the field 110 is an oil field, natural gas field, geothermal field or other natural resources field where multiple surfaces locations 101, 102 and 113 are used to drill vertical wells or multiple horizontal wellbores 105, 106, 107, 108, 111, 112, 114, 115, and 116. The horizontal wellbores are frequently drilled in the direction perpendicular to the regional maximum horizontal stress direction 117 (as shown in FIG. 2) to allow for the development of transverse hydraulic fractures that will grow from the wellbore and in the direction of the maximum horizontal stress 117 when the geomechanical properties of the formation 104 is brittle and have the optimal stress conditions allowing the propagation of the hydraulic fractures. In this regard, FIG. 2 shows the location of completed and stimulated horizontal wells 105 (each showing a continuous line for the completed and stimulated wellbore), and the location of drilled but not completed wells 107 (each showing a dotted line for the drilled but not completed wellbore) and the location of undrilled wells 114 (each showing a semi-dashed line for the undrilled wellbore) in a field 110. As will be discussed below, in some instances data regarding the drilled and not completed wells 107 is utilized to estimate the geomechanical properties that could be used to optimize the completion of drilled wells 107 and optimize the drilling and completion of undrilled wells 114

Surface seismic data is sometimes available in the field 110. If available, the surface seismic data can be combined with well data to delimit the boundaries of regions 104 and 103 as well as provide information on the dynamic geomechanical properties. The following description will primarily focus on the real time estimation of geomechanical and other rock properties of undrilled wells 114.

Figure 3:
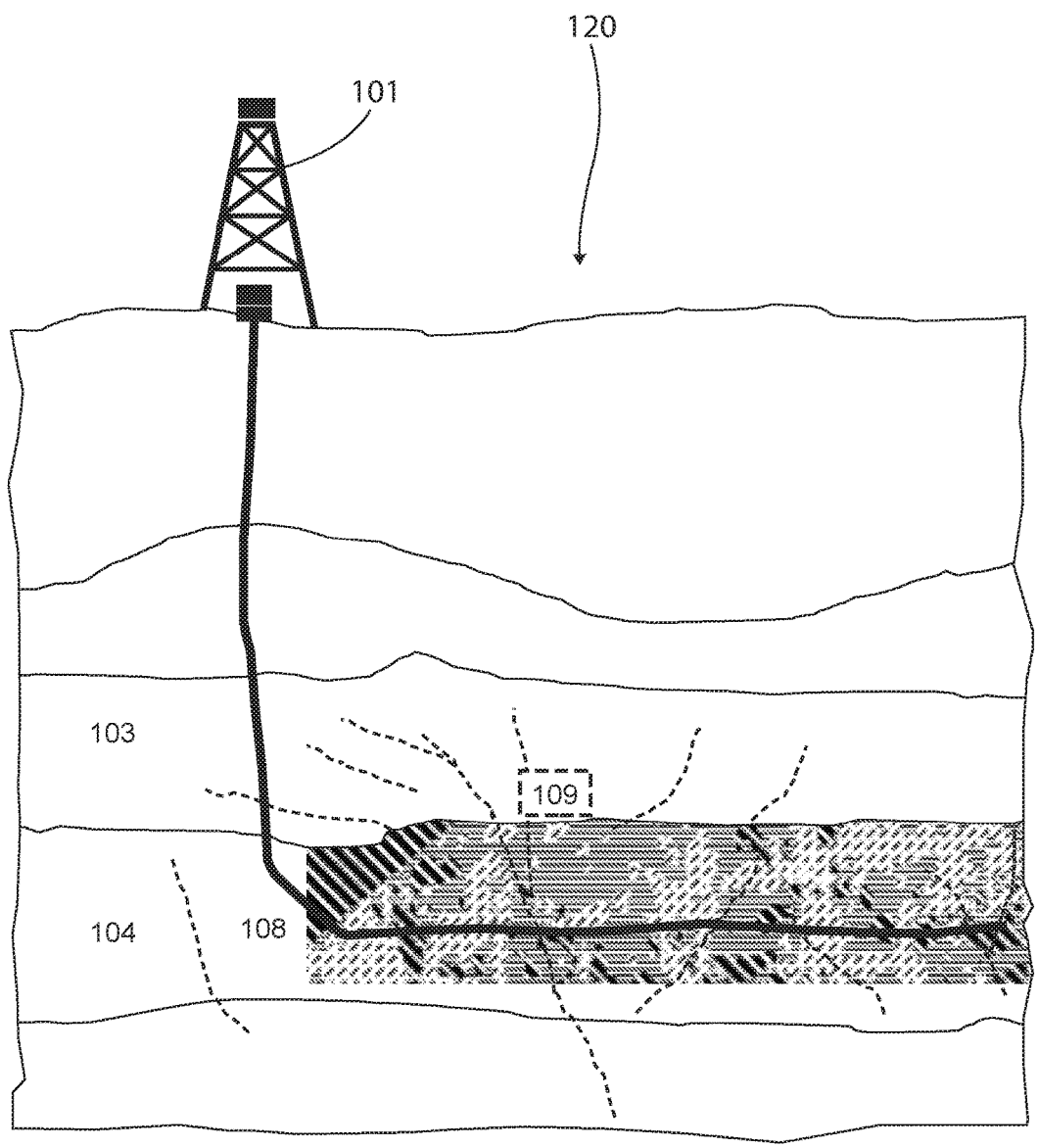
FIG. 3 is a diagrammatic representation of the geosteering in a geologic formation using real time drilling data to estimate geomechanical and other rock properties

FIG. 3 shows a wellbore 108 that has been drilled, but not completed and stimulated, crossing a subterranean region 104. In some implementations, the well 101 is used to apply an injection treatment to extract resources from the subterranean formation 104 through the wellbore 108.

Figure 4A:
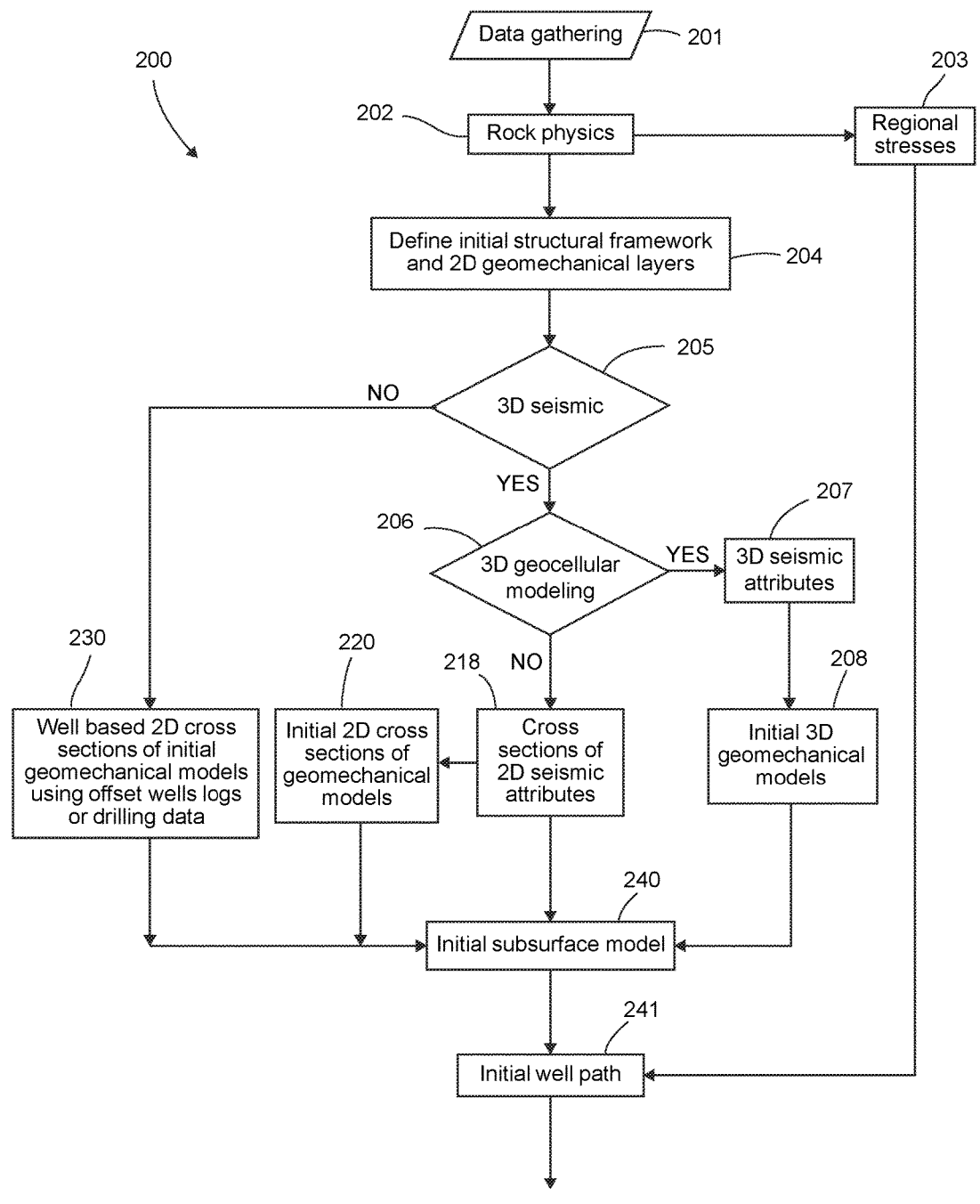
FIGS. 4a and 4b are a diagrammatic flowchart of a method for geosteering in a subterranean geologic formation where the distribution of the geomechanical properties and other rock properties are updated in real time using drilling data and an accurate drilling model, in accordance with the present invention.
Figure 4B:
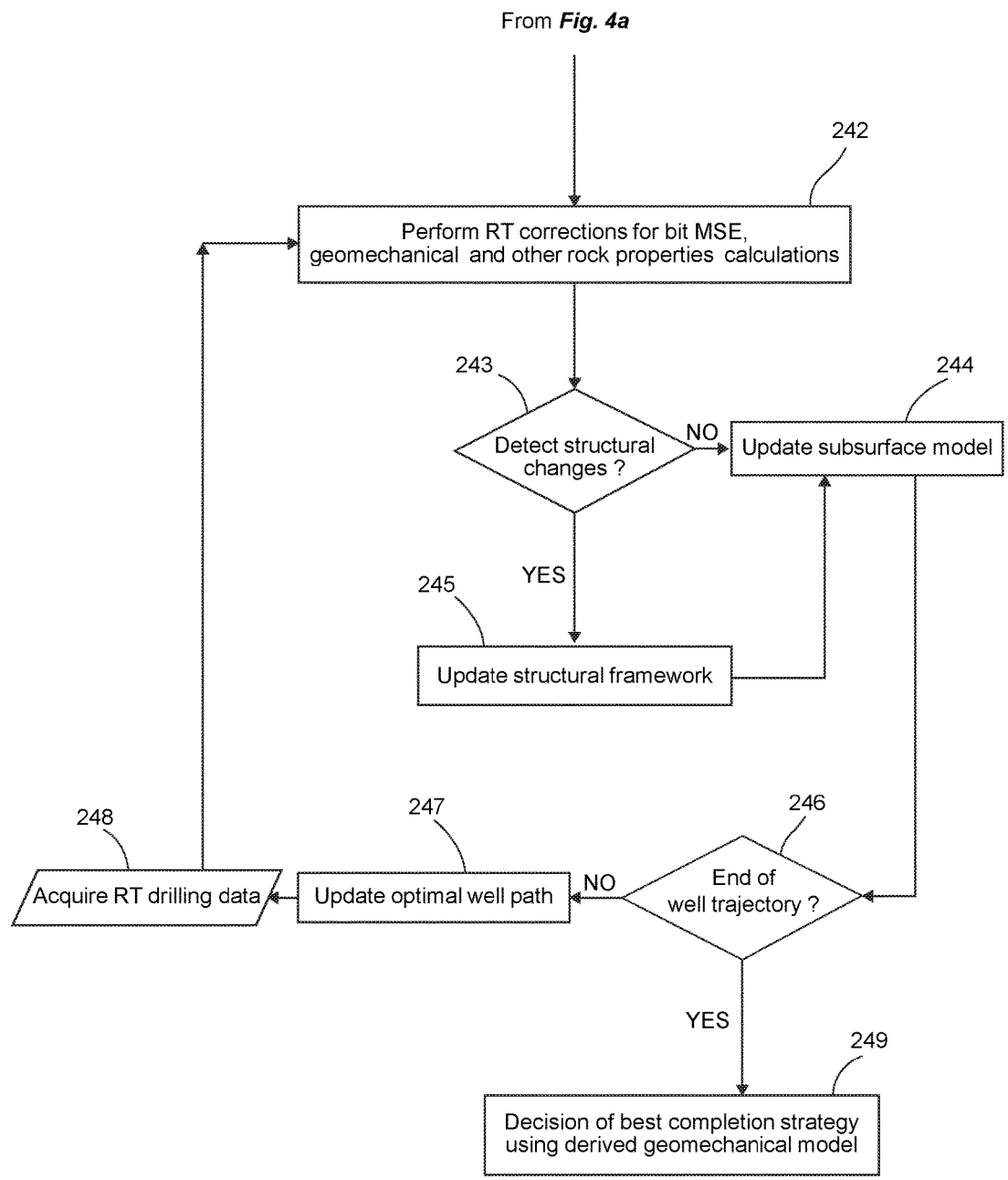

FIGS. 4a and 4b are a flow chart of an exemplary method of using real time drilling data to compute geomechanical properties and distribute them along and ahead of the wellbore for geosteering into the brittle rock with the best stress conditions that will provide the best completion optimization according to the present invention. In this regard, the method will be described with respect to various steps. Generally, the present invention aims to optimize in real time wellbore position to achieve after the drilling is completed the best hydraulic fracturing of new wells through the use of drilling data which is available in every well. The process involves multiple steps including data gathering, drilling model and estimation of geomechanical and other rock properties, updating the structural framework and rock properties, updating the subsurface model and then geosteering into the best rock.

The data used is comprised of data such as well locations, drilling, logging, and seismic data. A major advantage of the present invention is the ability to use real time drilling data that will be used in an accurate drilling model to quickly simulate (i.e., in few minutes) the key input needed to estimate in real time the geomechanical and other rock properties and possible structural changes. The resulting outputs of the present invention include the structural framework, the geomechanical and other rock properties along the wellbore, which can be used to optimize the position of the wellbores and hydraulic fractures to produce the highest production of hydrocarbons while keeping the drilling and completions costs to a minimum and reducing the impact on the environment by avoiding using excessive water and sand on completion stages that will not successfully produce hydrocarbon.

Data gathering is an important part of the method as many of the subsequent steps and analysis depend on the data gathered in step 201 of FIG. 4a. To this end, data can be extracted from a variety of available sources. Examples of the various types of data that are commonly utilized will be described below, however, no limitation is intended. Rather, it is understood that the present invention can utilize essentially any type of information related to a field/reservoir or wells that can be quantified in some manner. Accordingly, one of ordinary skill in the art will recognize that extension of the present invention to types of data not explicitly described within the present disclosure is still within the scope of the present invention. Further, it is understood that data may come in various types of file formats, including imported data from proprietary databases found in commercial software, open databases, spread sheets, pdf files, text files, ASCII files (e.g., LAS files designed for well logs), xml files, SEGY files (e.g., special ASCII files designed for seismic data) or combinations thereof. In this regard, it is also understood that the file formats include both common file formats and proprietary file formats. Generally, data obtained from any type of format may be utilized within the methods and systems of the present disclosure. Those of ordinary skill in the art will recognize that some file conversion or other processes are implemented in some instances to allow for the proper processing of the data from the various file formats within the context of the present disclosure. Accordingly, the details of such conversions and processing will not be described in detail herein.

In some instances, the data gathering step 201 includes gathering or obtaining well locations and deviations, and reservoir properties estimated from wireline logs such as gamma ray, density, resistivity, neutron, compressional and shear sonic, and image logs such as FMI, FMS, petrophysical interpretations leading to the estimation of porosity, water saturation, and core data providing measurement of total organic carbon (TOC), porosity, permeability, and fracture density. In some instances the data gathering includes geologic reports, geologic formations tops and 3D geocellular grids that will allow the identification of the boundaries of the geologic formations 103 and 104 in the wellbores. The 3D grids could be imported from existing reservoir modeling software or constructed using the geologic formations tops available in the existing wells, wireline logs, and seismic data and its interpretation if available.

In some instances, the data gathering step 201 includes gathering or obtaining seismic data and seismic attributes. The seismic data could be post-stack or pre-stack, and the seismic attributes could be derived from a multitude of post-stack and pre-stack processes that include seismic resolution enhancement or bandwidth extension methods that allow the seismic signal to reach higher frequencies, seismic structural attributes such as coherency, similarity, volumetric curvature or any other seismic method that uses these seismic attributes to image faults and fractures, spectral decomposition methods that provide frequency dependent seismic attributes or any seismic attribute that combines multiple spectral attributes, post-stack seismic inversion methods such as colored inversion, deterministic inversion, sparse spike inversion, generalized linear inversion, stochastic or geostatistical inversion, pre-stack seismic inversion methods such as extended elastic inversion, simultaneous pre-stack inversion, AVO methods, azimuthal anisotropy methods, shear wave velocity anisotropy methods, isotropic and anisotropic velocity models and all other seismic methods that use seismic data to provide information over a large reservoir volume that includes one or multiple wells.

In some instances, the data gathering step 201 includes gathering or obtaining drilling reports and measurements, such as rate of penetration, mud losses and information derived from mud logs such as total gas, gas chromatography measurements. Mud losses and gas chromatography measurements are commonly available data and could be utilized as a proxy of fracture density when there are no wireline, image logs and core data.

In some instances, the data gathering step 201 includes gathering or obtaining completion stimulation data. The completion data includes the position and depth of the perforation clusters, cluster per fracture stages, tubing size, completion time. The stimulation data includes treatment volumes and rates, completion stages, initial and final instantaneous shut-in pressure (ISIP), breakdown pressure, closure pressure, conductivity, fracture gradient or other information regarding stimulation.

In some instances, the data gathering step 201 includes gathering or obtaining hydraulic fracture stage performance indicators such as production logs, tracer tests, fiber optics, that provide quantitative or qualitative information on the performance of each hydraulic fracture stage.

In some instances, the data gathering step 201 includes gathering or obtaining well production rate and pressure, such as oil, water, and gas production rates, cumulative productions, estimated ultimate recovery, initial production of the first 30, 90 and 180 days, pressure and production decline parameters. These production and pressure data could be used in multiple ways including validation of the derived predicted results of workflow as well as natural fracture density proxy if there are no available wireline and image logs, petrophysical interpretation or core data to quantify the geomechanical properties at the wells. These production and pressure data are the result of the interaction of three major factors. These three factors are first the geologic heritage and the resulting resource represented by the rock porosity and the total organic carbon (TOC), second the plumbing or permeability created during the stimulation which depends in large part on the rock geomechanical properties and the natural fractures, and third on the drilling, completion and stimulation design. The first factor can be optimized by finding the geologic sweet spots where the best rock property that has the best combination of porosity and TOC can be found. The second factor depends largely on the geomechanical sweet spots driven largely by the geomechanical properties such as Young's Modulus (YM) and Poisson's Ratio (PR) and the local stress conditions created by the far field stress interaction with these variable geomechanical properties, geologic discontinuities such as natural fractures and reservoir pore pressure. The third factor and the optimization of the completion of the well depends in large part on the second factor. The workflow provides in real time the geomechanical sweet spots which represents the parts of the reservoir where the geomechanical properties and the stress conditions are suitable for optimal drilling, completion and stimulation design to achieve the highest well production while keeping the cost as low as possible by avoiding drilling and stimulating poor rock that will not produce.

In some instances, as part of the data gathering step 201, the collected data is processed to fit the needs of the subsequent steps of the method in FIGS. 4a and 4b. For example, many data types require quality control steps to remove noise and outliers that could introduce errors in the subsequent modeling steps of the method in FIG. 4a. The outcome of the data gathering process 201 and the quality control applied to a data set that will include one or multiple wells that will have varying data collected during and after drilling, completion and stimulation as well as in some instances volumetric information represented by seismic, microseismic or tiltmeter data that provide information over a large area around one or more wells.

Returning to FIG. 4a, with the data gathered at step 201, the method continues at step 204 where the initial structural framework and geomechanical layers are defined using existing or nearby wells. This initial structural framework contains the initial estimation of the boundaries of regions 104 and 103 represented by horizontal geologic surfaces and discontinuities such as faults.

Returning to FIG. 4a, with the data gathered at step 201, the method continues at step 202 with rock physics and estimation of initial geomechanical properties and stress conditions. In this step, the objective is to estimate the initial static elastic properties which include the Poisson's Ratio, and Young's Modulus and to compute the minimum and maximum stresses. In some instances the wireline and image logs, petrophysics interpretation, core data is not available at all or is available only in a limited number of wells. When the wireline logs and core data is not available in any well, step 202 can use drilling data from nearby wells until log data becomes available in the field 110. If the compression, shear sonic and density logs are available in wells 101 and 102, the dynamic geomechanical properties such as Young's Modulus and Poisson's Ratio are computed using established geophysical relationships. If static measurements of the geomechanical properties made in laboratory tests conducted on reservoir rocks are available, the dynamic geomechanical properties derived from the geophysical logs could be calibrated to the static measurements and used in the next steps of the method in FIGS. 4a and 4b. If the laboratory static measurements of the geomechanical properties are not available, then published correlations or nearby well data could be used to estimate the adjustment factor needed to multiply the dynamic geomechanical properties.

The geomechanical properties derived at the wells 101 and 102 need to be propagated in the entire subterranean formation 104 and 103. This could be accomplished by using well data alone in step 230, or by combining the available well data with seismic data taken in a 3D volume in step 207, or along a 2D cross section following the wellbore in step 218, if available. If no seismic data is available, the geomechanical properties available in the wells 101, 102 and other possible wells in the field 110, could be distributed in the subterranean formations using deterministic, geostatistical, neural networks, or any other reservoir modeling method in step 230. When seismic data is available, it could be used to derive the distribution of the geomechanical properties in multiple ways. When pre-stack seismic is available, it can be used in pre-stack elastic inversion to derive directly the seismically-derived compressional and shear velocity along with an estimate of the density, which are then combined to form the seismically-derived dynamic geomechanical properties. These dynamic geomechanical properties are adjusted to static measurements using the same procedure described for the adjustments applied to the elastic properties derived from well logs. If pre-stack seismic is not available, post-stack seismic attributes could be used to guide the geostatistical or neural network based interpolation in the subterranean formation 104 and 103 of the geomechanical properties derived at wells 101, 102 and other possible wells in the field 110.

After the geomechanical properties have been estimated for the entire subterranean formations 104 and 103 to form the initial subsurface model in step 240, the present method continues at step 203 with the estimation of the regional stresses. In this step, the objective is to estimate at the wells the vertical stress, the pore pressure and the magnitude and orientation of the regional horizontal stresses in field 101. This estimation depends on the available data in the field 101 or in nearby fields. For example, various methods that can be used to compute these stresses and the data needed for each method are described in detail in the book by Mark Zoback entitled "Reservoir Geomechanics", from Cambridge University Press (2010). A variety of conventional techniques for estimating these stresses and data are known in the industry.

Referring again to FIG. 4a, the present method continues at step 241 with the estimation of the initial well path is drawn according to multiple constraints that include geologic, and drilling considerations. The present method then continues at step 242 with the use of real time (RT) drilling data for bit corrections of mechanical specific energy (MSE) and its use to compute the geomechanical and other rock properties. MSE is defined as the amount of energy input required to remove a unit volume of rock during drilling. In order for MSE to be used effectively for geosteering purposes, the uncertainties related to absolute and relative depth, absolute and differential stress and the correlation between the mechanical specific energy (MSE) being applied by the rock bit to rock compressive strength and mechanical properties—Young's Modulus (YM) and Poisson's Ratio (PR) need to be constrained and established.

This can be done by analyzing petrophysical and drilling mechanical data obtained during the drilling of exploration, delineation and/or earlier production wells in the area. In the worst case it can be done by real-time analysis and correlation of the data derived while drilling the well to be geosteered. The methodologies to do this are well understood and established in the industry.

During the drilling of the well real-time drilling data such as: measured/hole depth, surface hook load, surface (or downhole) weight on bit (WOB), rate of penetration (ROP), standpipe pressure (SPP), surface rotary and downhole motor RPM, flow rate/total pump output (TPO), MWD gamma, mud density/mud weight, differential pressure, pore pressure, plastic viscosity and survey data are acquired and used to calculate the energy being applied by the drill bit to fail the rock. This measurement can be applied to calculate rock compressive strength (confined and unconfined) and rock mechanical properties (YM and PR):

Confined Compressive Strength (CCS):

$$CCS = \left[\frac{ROP_{field}}{K \times DWOB^{b_1} \times RPM^{c_1} \times h_x \times W_f \times B_x}\right]^{\frac{1}{a_1}}$$

Unconfined Compressive Strength (UCS):

$$UCS = CCS/(1 + a_s \times P_c^{b_s})$$

and:

$$YM(E): E = UCS \times a_E$$

Where $a_1$, $b_1$, $c_1$ and $a_s$, $b_s$ and $a_E$ are empirical constants. $W_f$ is a function for bit wear and $h_x$ is a bit hydraulic efficiency function.

For a PDC Bit: $h_x = f(HSI, ROP, D_b, JSA)$

For a roller cone bit: $h_x = f(HSI, ROP, D_b)$

Where HSI is the hydraulic impact force, $D_b$ is the bit diameter and JSA is junk slot area. The critical parameters to determine accurately are ROP, WOB and bit RPM. The effect of bit hydraulic impact force (HSI) is small and can be ignored. Ideally a downhole WOB and RPM sensor is used to measure and telemeter real-time WOB and RPM data to surface to apply to the calculations.

Typically ROP can be accurately determined from surface measurements, although corrections may need to be applied in a deep well, where pipe compression and buckling may indicate forward progress of the bit, where this may not actually be happening. If only surface measurements of hook load and rotary RPM are available, allowances must be made for reduction in WOB (which at surface is estimated from the difference between on and off bottom hook load) due to frictional losses and the effects of upsets in the drill string and bottom-hole assembly, such as tool joints and stabilizers, hanging up on irregularities in the wellbore, such as ledges, casing shoe and such like and for bit RPM by adding the additional rotary speed applied to the bit by a downhole mud motor, or drilling turbine.

There are relatively simple and also more complex calculations and models in the industry to derive the loss in WOB due to friction and mud motor RPM from mudflow and differential pressure. A simple soft string drilling model such as the one below can be applied to calculate the frictional losses along the drill string:

$$\frac{dFt}{ds} + wbp\cos\varphi \pm \mu_f \sqrt{\left(F\left(\frac{d\varphi}{t_{ds}}\right) - wbp\sin\varphi\right)2 + \left(F_t \sin\frac{d\vartheta}{ds}\right)2} = 0$$

This equation was presented by Johancsik, C. A., Dawson, R. and Friesen, D. B.: "Torque and Drag in Directional Wells—Prediction and Measurement", LADC/SPE conf., SPE paper #11380, New Orleans, 1983, pp. 201-208, and later on by Sheppard, M. C., Wick, C. and Burgess, T. M.

"Designing Well Paths to Reduce Drag and Torque", SPE paper #15463, Presented at SPE Conf., October 1986, New Orleans, p. 12.

The friction coefficient (μ) in the above can be estimated by comparing the measured hookload while off bottom (WOB=0) and rotating versus the actual buoyed hookload that can be calculated from volume of drill pipe and Bottom Hole Assembly (BHA) in the wellbore and the buoyancy factor as a function of the mud weight and the density of the steel material in the wellbore. The friction factor thus determined is the average of all the different friction factors in the wellbore, but can be used over relatively small distances and updated whenever possible (typically during connections).

More sophisticated models continuously update the apparent friction factor as drilling progresses to identify times when the drill string may be hanging up, or the nature of the wellbore is changing due to borehole instability, cuttings bed accumulations, etc.

For the computation of the geomechanical and other rock properties, the methodology used in this invention uses the classical rock strength criterion to estimate the confined compressive strength (CCS) combined with the pore pressure estimation technique to estimate the unconfined compressive strength (UCS). The drilling efficiency which is the ratio of the energy required over energy spent in breaking a unit volume of the rock is computed based on the CMSE and the CCS. This is augmented by fitting a trend line to the drilling efficiency data which is then used to analyze the pore pressure deviations using the approach described by Majidi, R., Albertin, M., & Last, N. "Method for Pore Pressure Estimation Using Mechanical Specific Energy and Drilling Efficiency". Society of Petroleum Engineers, (2016, Mar. 1) doi:10.2118/178842-MS The next step is to leverage all the attributes derived up to this point in order to build a real-time wellbore geomechanical model. The objective is to feed the wellbore geomechanical model, which is based on the frictional faulting theory, with the unconfined rock strength (UCS) and the pore pressure in order to estimate and constrain the in-situ stresses. Then, rock strength information is used with industry established correlations such as the one provided above to estimate the rock mechanical properties such as the Young's Modulus (YM), Poisson's Ratio (PR), shear modulus (G), porosity (PHI), and the Natural Fracture Index (NFI). From these geomechanical logs, a brittleness index can be computed.

The most common brittleness index used in hydraulic fracturing relies only on the use of a combination of Young's Modulus and Poisson's Ratio. A more appropriate brittleness index for hydraulic fracturing that can be computed from the estimated rock properties included in this invention, needs to include a combination of in-situ stresses though the use of the maximum principal stress $\sigma_1$, and minimal principal stress $\sigma_3$, as well as the rock strength parameters such as rock cohesion C, and angle of internal friction φ as proposed by Papanastasiou and Atkinson, "The Brittleness Index in Hydraulic Fracturing," American Rock Mechanics Association, (2015, Nov. 13) in the following equation:

$$\text{Stress Brittleness} = 1 - \frac{\sigma_3 - \sigma_1}{2C\cos\varphi - (\sigma_1 + \sigma_3)\sin\varphi}$$

Referring to FIG. 4b, the present method continues at step 243 with the detection of any major change of structural framework such as the crossing of a fault with displacement or a change of dip in the geologic beds. If such information is confirmed with the estimated geomechanical properties and measured data acquired during drilling, the initial structural framework is updated 245 to accommodate the update of the distribution of the geomechanical properties Once the absolute and relative depth errors are further confined and an updated structural framework 245 is finalized, and the rock mechanical properties have been thus estimated and the correlation between drilling energy and rock mechanical properties has been established the result can be used to recalculate and distribute rock geomechanical and other properties in the subsurface model 244 which will be used to perform geosteering based on this data by applying a forward projection of the expected and desired properties along the wellbore to be drilled Referring again to FIG. 4b, the present method continues at step 246 where in the event that the well did not reach its target length, the updated subsurface model is used for updating the well path 247 and providing the driller and directional driller with numerical and visualization thereof similar to the geosteering techniques based on petrophysical data and geomechanical models. This process continues with the acquisition of new real time drilling data 248 and its use to move the drilling forward.

At the completion of the drilling, an updated subsurface model with its detailed geomechanical and other rock properties and major structural features will be available to design the best completion strategy that will target the brittle zones that will provide the best stimulation outcome while avoiding major structural features such as faults that could waste stimulation energy or cause poor production results due to excessive water production from other formations.

The previous discussion provides an example of how the results are applied in the context of the present disclosure, however no limitation is intended thereby. Rather, it is understood that the methods of the present disclosure can apply the derived results to a wide array of uses for wells drilled and completed, wells drilled but not completed, and undrilled wells. Accordingly, one of ordinary skill in the art will recognize that extension of the methods of the present disclosure to other uses of the derived geomechanical properties and updated structural model, not explicitly described within the present disclosure is within the scope of the present invention.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. A method for geosteering while drilling a well in a reservoir, said method comprising:
   creating an initial subsurface model of the reservoir, including a structural framework, geomechanical and rock properties within the reservoir;
   determining an initial well path within the reservoir based at least in part on the initial subsurface model; and iteratively performing the following steps in real time during drilling of the well:
(a) gathering drilling data;
(b) computing a corrected mechanical specific energy (CMSE) for the region of the reservoir adjacent to drilling, based at least in part on the drilling data and the subsurface model;
(c) computing revised geomechanical and rock properties from the CMSE;
(d) revising the subsurface model, including correcting the structural framework, and interpolating the geomechanical and rock properties in the region of the reservoir ahead of drilling, based at least in part on the revised geomechanical and rock properties; and
(e) drilling a well in the reservoir having a trajectory based at least in part on the rock properties predicted by the revised subsurface model in the region of the reservoir ahead of drilling.

2. The method of claim 1 wherein the revised rock properties computed from the CMSE comprise Young's Modulus.

3. The method of claim 1 wherein the revised rock properties computed from the CMSE comprise Poisson's Ratio.

4. The method of claim 1 wherein the revised rock properties computed from the CMSE comprise the shear modulus.

5. The method of claim 1 wherein the revised rock properties computed from the CMSE comprise a natural fracture index.

6. The method of claim 1 wherein the revised rock properties computed from the CMSE comprise stress brittleness.

7. The method of claim 1 wherein the revised geomechanical properties computed from the CMSE comprise pore pressure.

8. The method of claim 1 wherein the revised geomechanical properties computed from the CMSE comprise stresses.

9. The method of claim 1 wherein the step of interpolating the geomechanical and rock properties in the region of the reservoir ahead of drilling includes stresses and a brittleness index.

10. The method of claim 9 wherein the step of drilling the well comprises drilling into a brittle zone of the reservoir.

* * * * *